United States Patent
Dagenais

(10) Patent No.: US 9,321,118 B2
(45) Date of Patent: Apr. 26, 2016

(54) WELDING DEVICE INCLUDING A CARRIAGE AND TWO ACTUATORS FOR ORIENTING A WELDING HEAD

(75) Inventor: Jean-Francois Dagenais, Cassis (FR)

(73) Assignee: SERIMAX, Mitry-Mory (FR)

( * ) Notice: Subject to any disclaimer, the term of this patent is extended or adjusted under 35 U.S.C. 154(b) by 324 days.

(21) Appl. No.: 13/825,557

(22) PCT Filed: Sep. 23, 2011

(86) PCT No.: PCT/FR2011/000523
§ 371 (c)(1),
(2), (4) Date: Jun. 11, 2013

(87) PCT Pub. No.: WO2012/038624
PCT Pub. Date: Mar. 29, 2012

(65) Prior Publication Data
US 2013/0248506 A1    Sep. 26, 2013

(30) Foreign Application Priority Data
Sep. 24, 2010    (FR) ...................................... 10 57730

(51) Int. Cl.
*B23K 9/12*     (2006.01)
*B23K 9/028*    (2006.01)
*B23K 9/167*    (2006.01)
(Continued)

(52) U.S. Cl.
CPC .................. *B23K 9/12* (2013.01); *B23K 9/0286* (2013.01); *B23K 9/1675* (2013.01); *B23K 9/1735* (2013.01); *B23K 9/30* (2013.01);
(Continued)

(58) Field of Classification Search
CPC ............ B23K 5/02; B23K 5/023; B23K 5/06; B23K 5/08; B23K 7/006; B23K 9/0253; B23K 37/0282
See application file for complete search history.

(56) References Cited

U.S. PATENT DOCUMENTS 3,035,156 A    5/1962    Staley
3,748,426 A    7/1973    Stanley
(Continued)

FOREIGN PATENT DOCUMENTS

JP    5 69147      3/1993
WO    01 34340     5/2001

OTHER PUBLICATIONS

International Search Report Issued Dec. 9, 2011 in PCT/FR11/00523 Filed Sep. 23, 2011.

*Primary Examiner* — Brian Jennison
(74) *Attorney, Agent, or Firm* — Oblon, McClelland, Maier & Neustadt, L.L.P.

(57) ABSTRACT

A welding device for weld-assembly of first and second parts, defining therebetween a sealing surface, along a weld joint. The device includes: a supporting mechanism configured to move the device along the weld joint; at least one welding mechanism; and an automatic command and control mechanism. The welding mechanism is mounted on a single supporting element oriented substantially parallel to the sealing surface. A first motorized actuator secured to the supporting mechanism includes a first projection cooperating with an open housing in a first end face of the supporting element, and a second motorized actuator secured to the supporting mechanism includes a second projection cooperating with an open housing in a second end face of the supporting element. The first and second projections are movable in a plane substantially perpendicular to the sealing surface and generate controlled movement of the supporting element of the welding mechanism.

13 Claims, 3 Drawing Sheets

(51) Int. Cl.
*B23K 9/173* (2006.01)
*B23K 9/30* (2006.01)
*B23K 37/02* (2006.01)

(52) U.S. Cl.
CPC ........ *B23K 37/0217* (2013.01); *B23K 37/0241* (2013.01); *B23K 37/0276* (2013.01); *B23K 2201/06* (2013.01)

(56) References Cited

U.S. PATENT DOCUMENTS

| | | | |
|---|---|---|---|
| 3,974,356 A | | 8/1976 | Nelson et al. |
| 4,216,945 A | * | 8/1980 | Krieg .............................. 266/56 |
| 2012/0074203 A1 | | 3/2012 | Dagenais |

* cited by examiner

WELDING DEVICE INCLUDING A CARRIAGE AND TWO ACTUATORS FOR ORIENTING A WELDING HEAD

The invention relates to the field of welding mechanical parts by all methods that cause fusion of materials, in order to join these parts or produce one or more sealing joints between them.

The invention extends to all construction sectors, metal or otherwise, and particularly to the welding of pipes or tubular parts which are to be positioned end to end to form continuous pipes over long distances.

The assembling of mechanical parts, whether they comprise flat or tubular elements, as in the case of pipelines, for example, or elements of any shape, is carried out by placing the edges or surfaces together with little or no space and moving the welding means along the welding line or zone thus formed.

If a sealing joint is to be produced, on one part or between several parts, the welding means are moved along the line or lines that are to be sealed.

The invention relates more particularly to the kinematics of the welding means when they are moved along the weld zone or line. This movement may be made by any type of support means, for example a robot or rail-mounted carriage, a wheeled vehicle or other designs according to the application envisaged.

The welding means comprise the elements, or tools, which allow different welding processes to be carried out such as, for example, so-called TIG (Tungsten Inert Gas) welding, MIG (Metal Inert Gas) welding, MAG (Metal Active Gas) welding, laser welding, etc. These means notably comprise welding torches.

Mechanical construction operations, particularly the joining of parts, require certain welding qualities to ensure personal safety and installation reliability.

The production of pipeline-type assemblies is carried out by placing tubes or pipes having substantially the same cross-sections in an end to end position, then carrying out annular welding between the pipe ends thus positioned.

According to a known off-shore or on-shore practice, some pipe lengths are welded together, then transported to the site. There, they are positioned relative to a pipe already in place and welded thereto.

In off-shore applications this type of prefabrication or pre-assembly may be carried out directly on the ship. The welds need to be of very high quality to withstand both the journey and particularly the pipeline operation where the environmental conditions, such as high pressures, for example, are frequently severe and where fluids containing corrosive constituents (gas, oil, sludge, etc.) may circulate.

To form such pipes it is usual to weld a pipe portion to one end of a set of pipes already welded together, from an off-shore mobile barge. As the barge moves continuously under the effect of wave motion the welding is carried out under particularly difficult conditions.

Furthermore, the weight of the pipes and the stresses in play are considerable: each pipe may weigh several hundred kilograms or even several tens of tonnes.

The quality of the weld is a determining factor for the service life of the finished pipes and for their reliability and/or safety. This is also very important for production: a defective weld has to be repaired and this disrupts the production cycle.

In automatic welding the correct filling of the space between the parts that are to be welded may be a source of difficulties, particularly when the spacing between these parts varies with their thickness.

More specifically this space may have a V- or U-shaped profile, caused for example by the machining of the ends of the parts to be welded. The weld is then deposited from the base of the V or U up to its ends, which generally correspond to the zone that is closest to the outer wall of the parts to be welded. This is done by applying successive layers. This is frequently the case in the field of pipelines, where welds between the ends of the pipes are annular in shape.

Close to the outer wall, the distance between the edges of the parts is great (in fact, at its greatest), which currently requires two weld beads to be formed side by side to fill the space properly. When two welding means, typically torches, are used to do this, adjustment is necessary in order to offset them laterally, i.e. along the longitudinal axis of the pipes to be welded, relative to one another.

This adjustment is carried out manually by an operator. This takes time, which is expensive in production terms.

One particular difficulty that is often encountered in the welding of pipelines is in the production (welding) of the outermost layer or layers of the weld bead, which are intercalated and fill the space, an annular space in the case of a pipeline, between two ends of parts (tubes or pipes, in the case of pipelines). This final step is known as "capping" in the art.

Numerous solutions have been developed for overcoming these difficulties.

In the publication U.S. Pat. No. 3,974,356, a welding assembly outside the pipes to be welded comprises two welding torches mounted on a common support. They are arranged one behind the other along the length of the weld that is to be carried out, i.e. along the circumferential displacement of the support, along the weld. The torches are connected to a common shaft which enables these torches to be moved relative to the support. This movement is chiefly rotary, i.e. "pendular", to use a term of the art. In relation to the pipes to be welded, the torches are thus moved in a common pendular movement, owing to the fact that the respective displacements of these torches are mechanically linked to one another. In other words, thanks to the intrinsic construction of this system, the oscillation movements performed by the two welding means about the longitudinal welding axis are the same.

A complex mechanism makes it possible to regulate manually the position of each of the torches relative to the common support. This makes it possible to produce two weld beads parallel to one another in the same pass, which constitutes a time saving compared with systems having only one torch. However, there is a drawback in that the adjustment of the torches has to be carried out manually, notably to adapt to the width of the bead that is to be produced. Moreover, certain orientations of the torches cannot be obtained with a system of this kind.

The U.S. Pat. No. 3,748,426 describes an assembly comprising three welding torches mounted on a common support. These torches are offset in the direction of the circumferential movement of the support and can be moved in translation relative to the support, independently of one another. In relation to the pipes, each torch is moved in a movement known as "lateral oscillation" resulting from the combination of the movement of advance of the support relative to the tubes and the movement of translation of the torch relative to the support. The position of these torches, notably their radial position, may be adjusted manually. As stated above, manual adjustment is both expensive and tricky.

In the absence of any mechanical connection linking the movements of these torches to one another, the oscillations of the different torches, perpendicularly to the joint plane, are necessarily differentiated. Only a movement of lateral oscillation of each torch independently of the other torches is possible. This excludes any particular movement such as pendular.

The invention sets out to remedy the drawbacks of the prior art and notably to propose a modular welding assembly of simple design while providing the possibility of adjusting the kinematics of the weld torches relative to the support.

The proposed device comprises a carriage supporting at least one welding head, as well as a first actuator comprising a part attached to the carriage and a moving part capable of sliding in a first direction, and a second actuator comprising a part attached to the carriage and a moving part capable of sliding in a second direction substantially parallel to the first direction. The welding head is mounted on the carriage with the ability to pivot relative thereto about an axis substantially perpendicular to said first direction and to said second direction under the effect of a relative sliding of the moving part of one of the first and second actuators relative to the other one of the first and second actuators.

Looked at in another way, the welding device proposed comprises a supporting carriage and at least one welding head, the welding head being mounted on the supporting carriage by means of an intermediate support. The proposed device further comprises a first motorised actuator, of which a first part is fixed to the supporting carriage and a second part, displaceable relative to the first, is connected to the intermediate support, and a second motorised actuator, of which a first part is fixed to the supporting carriage and a second part, displaceable relative to the first, is connected to the intermediate support. The respective second parts of the first actuator and second actuator are displaceable independently of one another in planes substantially parallel to one another, so that a controlled joint displacement of said second parts causes displacement of the intermediate support relative to the supporting carriage. This displacement is likely to comprise a component of rotation about an axis parallel to said planes that are substantially parallel to one another and a component of sliding parallel to these planes.

It is thus possible to carry out controlled and varied movements of the welding head and hence of the torches that it carries, thanks to a command device that controls the first and second actuators. The movements of these actuators may be combined in different ways to generate specific movements of the welding head.

The command device may control the first and second actuators such that their respective moving parts move linearly and simultaneously in one direction. This makes it possible to offset a central oscillation axis of each torch and to produce two weld beads parallel to one another.

This is of particular value for creating outer finishing welds known as capping, particularly on tubular pipes.

The command device may also control the first and second actuators so that their respective moving parts travel linearly and simultaneously in two opposite directions. This makes it possible to pivot the welding head about an axis that is substantially perpendicular to the directions of sliding of the actuators. This enables the welding head to be pivoted without the need for a specific rotary part. The gain is very interesting in terms of ease of manufacture, costs and maintenance, in particular. This rotary movement or pivoting advantageously makes it possible to extend the kinematic possibilities of the oscillations of the head.

The command and control may be provided by means of a microcomputer that is pre-programmed for the different types of control mentioned above. Any equivalent technical means may be used without departing from the scope of the invention.

Moreover, the command device may be arranged so as to vary the amplitude of sliding of the moving parts of the first and/or second actuator independently. This makes it possible to obtain controlled movements of the welding head that are differentiated and precise, as a function of each particular case. The welds thus formed are more precise and of a higher quality. They may be achieved in shorter times, particularly without the intervention of an operator.

The welding head may be mounted on the carriage with the ability to slide relative thereto, perpendicularly to the first direction and to the second direction, in order to position the welding head more or less close to the outer wall of each of the parts to be welded.

The device may also comprise means for individually varying the distance between at least a first and/or at least a second welding means and said weld joint. This enables the device to be adapted in optimum manner to the type of weld to be performed and to the geometry of the parts to be welded, notably in the case of tubular pipes.

The device may further comprise confinement means mounted on the welding head. The confinement means may comprise at least one flange cooperating with the welding head and together defining a confinement volume. This represents an advantageous possibility for producing a confinement space corresponding to the protective atmosphere between the electrode and the parts to be assembled, notably in the case of TIG, MIG or MAG welding.

The device may further comprise at least one position sensor attached to the welding head. This makes it possible in particular to position the welding head relative to the joint plane. This increases the precision and quality of the weld obtained.

The moving part of the first actuator may be connected to the welding head by a pivot joint with an axis which is perpendicular to the first direction of sliding, whereas the moving part of the second actuator is connected to the welding head by a connection that permits at least rotation about an axis perpendicular to the second direction of sliding, and sliding perpendicular to the axis of this rotation and to the second direction of sliding.

The moving part of the first actuator may comprise a first projection cooperating with an open housing on a first end face of the welding head, and the moving part of the second actuator comprises a second projection cooperating with an open housing on a second end face of the welding head.

The welding head may comprise an intermediate support mounted on the carriage by means of the first and second actuators and on which one or more welding torches are mounted.

Further features, details and advantages of the invention will become apparent from a study of the description that follows, referring to the attached drawings, wherein.

For greater clarity, identical or similar elements are designated by identical reference numerals throughout all the drawings.

Figure 5:
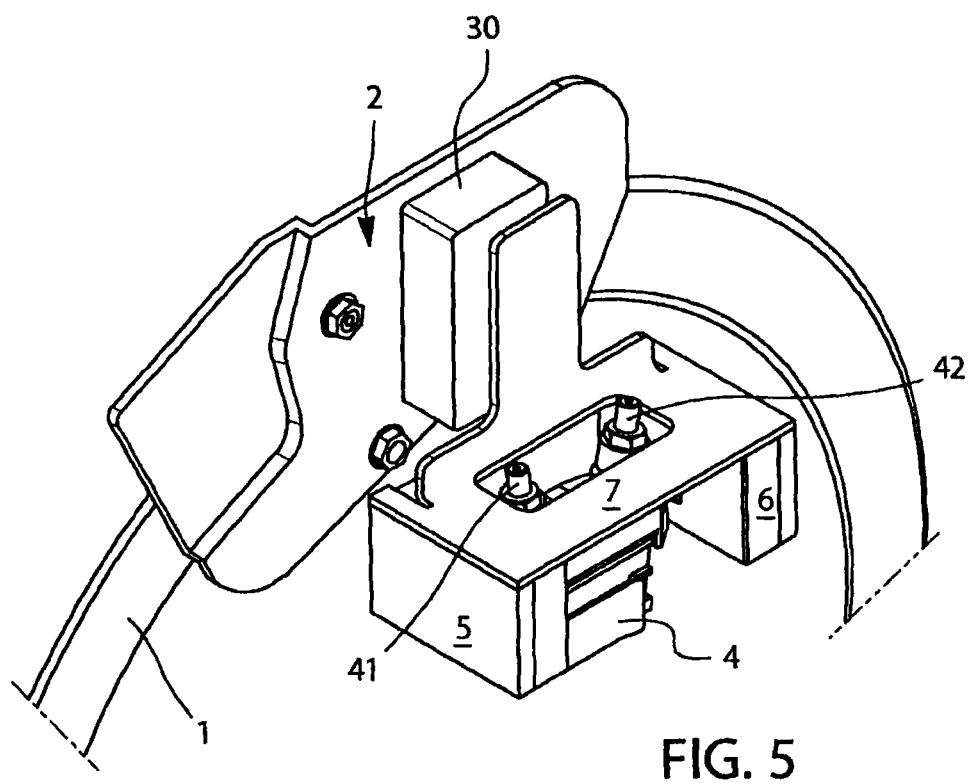
FIG. 5 shows the device of FIG. 1 positioned on a support, in perspective view.

FIG. 5 shows a welding device according to the invention positioned opposite parts to be welded (not shown), such as tubular pipes. An annular rail section 1 is fixed by any means known per se (not shown) to the outer wall of a tubular pipe. Such means comprise for example a support flange, also referred to as a collar or its English equivalent of "clamp", which is fixed around a tubular pipe.

The annular rail 1 is fixed close to the joint plane between the pipes that are to be butt-welded together.

The joint plane is defined as the plane containing the end surfaces of each of the parts or pipes to be welded when they are in contact with one another. The parts or pipes are positioned relative to one another and then pressed or made to abut, on one another by means known as clamping means, i.e. cramping and/or gripping means. These means are known per se.

In the case of the joining of tubular pipes, the surfaces in contact most often form a ring the internal diameter of which corresponds substantially to the (substantially identical) inner diameter of the pipes to be welded. The edges of the pipes are preferably bevelled, often with a root. The weld may then be a V or U weld, as it is known in the art, i.e. the distance between the end faces of the pipes increases in a radial direction, from the inside of the pipes towards the outside thereof. Different chamfer shapes may also be dealt with using the device according to the invention.

The joint plane is generally perpendicular to the longitudinal axis of the pipes to be welded.

Conventionally, the automatic welding of pipes is preferably carried out by a MIG or MAG process. According to these arc welding processes, which are known per se, a melting of the materials is obtained by the heat energy released by an electric arc that forms in a so-called protective atmosphere between a fusible electrode wire and the parts that are to be joined. This takes place at the joint plane, or close to it. The difference between the MIG and MAG processes depends on the composition of the gas present in the protective atmosphere.

In the MIG process, a neutral gas of the argon type is used, or a mixture of argon and helium gases, which does not react with the metals being welded. In the MAG process, a mixture of argon, carbon dioxide and hydrogen is used. In every case, the gas is continuously injected over the arc in order to insulate the molten metal completely from the ambient air. The quality of the weld depends largely on the degree of insulation of the molten metal during the welding. There are different gas supply means that are suitable for the operation of this type of welding equipment.

Figure 6:
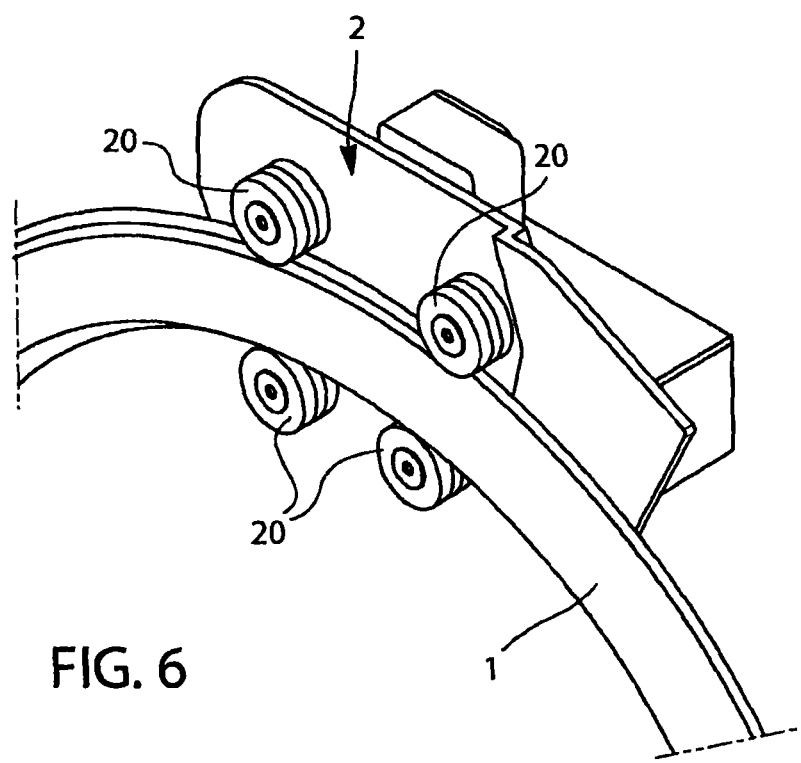
FIG. 6 shows a view analogous to FIG. 5, from a different observation angle.

In FIGS. 5 and 6, a carriage 2, or carrier means, or carrier, is movably mounted on the rail 1. In FIG. 6, the carriage 2 is mounted on the rail 1 via wheels 20, in this case four, or any other means that enable it to move along this rail while being held thereon.

The carriage 2 carries onboard welding means combined to form a welding head 4 which is held at a substantially constant radial distance from the pipes to be welded. The carriage 2 also carries the means necessary for the operation and control of the welding means, notably the electrical and gas fittings and connections.

Figure 1:
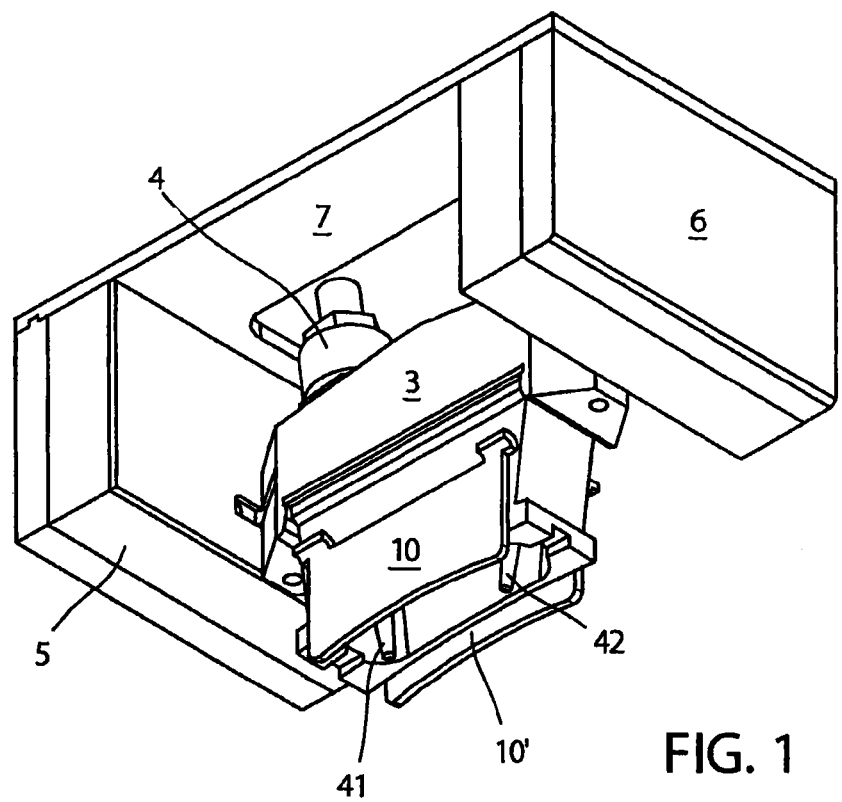
FIG. 1 shows a welding device according to the invention in perspective view.
Figure 2:
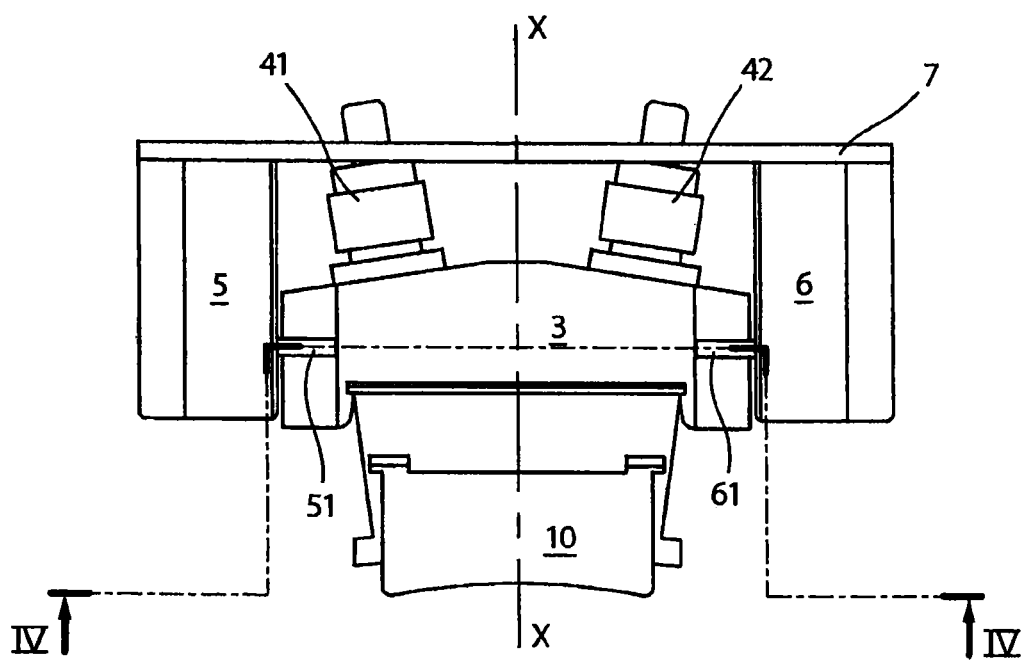
FIG. 2 shows a front view of the welding device of FIG. 1.
Figure 3:
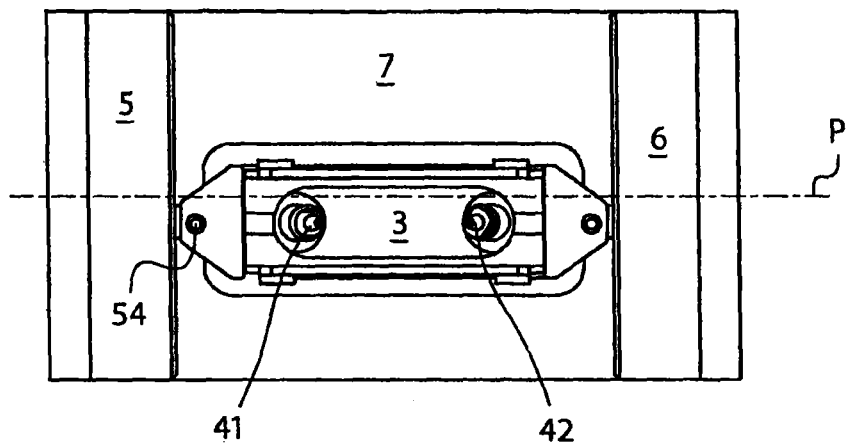
FIG. 3 shows the welding device of FIG. 2 viewed from below.

In FIGS. 1 to 3, the welding device comprises, as welding means, two welding torches 41 and 42, each carried by a single common support 3. The common support 3 is in the form of a substantially parallelepiped block with two large faces parallel to one another, or main faces. The common support 3 and the welding torches form what is known as a welding head, which is mounted on the supporting carriage. The common support 3 may be seen as an intermediate support because it is by means of this common support 3 that the welding torches 41 and 42 are mounted on the supporting carriage.

The support 3 comprises here an axis of symmetry XX. In the working position, the axis XX is oriented suitably relative to the pipes to be welded, i.e. substantially radially. The two large faces are then in planes oriented parallel to the joint plane (not shown). The welding torches 41, 42 are arranged one behind the other in the direction of movement of the support 3 relative to the pipes to be welded (circumferential), i.e. also the direction of movement of the carriage 2 along the rail 1. In other words, the axis of symmetry XX is located, during operation, at the intersection of a plane containing the longitudinal axis of at least one of the pipes to be welded and the joint plane.

The common support 3 comprises at least one first groove 52 and a second groove 62, each of which opens onto a respective side face of the common support 3, i.e. perpendicularly to the main faces. Each of these side faces extends substantially perpendicularly to the joint plane when the common support 3 is mounted on the pipes to be welded. The grooves may also be regarded as housing.

The housings 52, 62 each have a cross-section such that one of a first strap 51 and a second strap 61, respectively, can be accommodated therein.

The first strap 51 is part of a first actuator 5 loaded onto the carriage 2, or is attached to such an actuator. The first actuator 5 imparts a linear, or sliding, reciprocating movement to the first strap 51, in a first plane. The first actuator is motorised.

The second strap 61 is part of a second actuator 6 loaded onto the carriage 2, or is attached to such an actuator. The second actuator 6 imparts a linear, or sliding, reciprocating movement to the second strap 61, in the first plane, or in a plane parallel to this first plane. The second actuator is also motorised. Each actuator 5, 6 may consist of a casing containing a motor, provided with a pad eye which extends beyond it, as indicated previously. The casing is loaded onboard, i.e. connected to the carriage 2, by any means known per se. According to the embodiment shown in the drawings each actuator is bolted to a frame 7 which is in turn mounted on the carriage 2.

The frame 7 may be attached to the carriage 2. Here, a specific motor 30 mounted on the carriage 2 enables the support 3 to be moved along its axis of symmetry XX. Thus the support 3 may be moved away from or towards the joint, radially in the case of tubes, without moving away from or towards the carriage 2. The effect produced by this feature is particularly noticeable when the chamfers are delimited by walls close to one another, forming small angles between them.

Figure 4A:
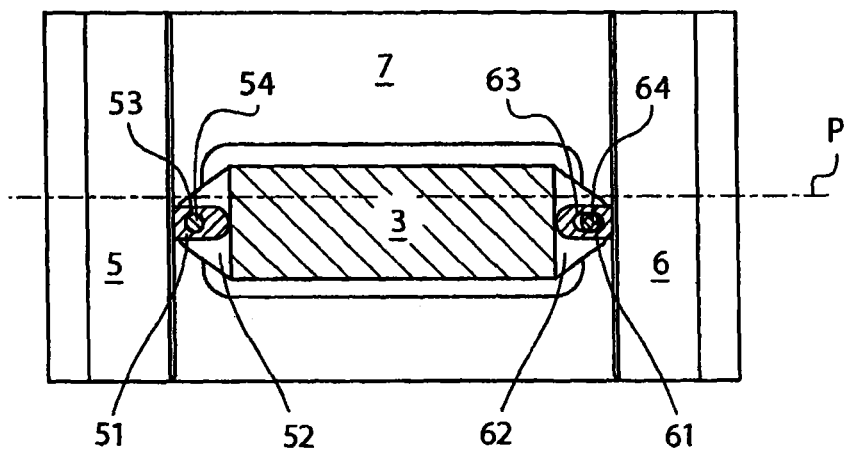
FIG. 4A shows the device of FIG. 2 in section along the line IV-IV, in a position characteristic of a first operating mode.
Figure 4B:
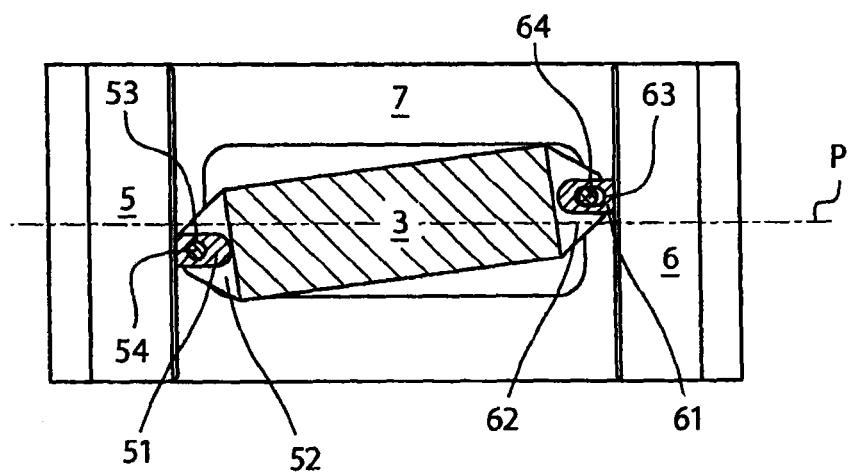
FIG. 4B shows the device of FIG. 2 in section along the line IV-IV in a position characteristic of a second operating mode.

In FIGS. 3, 4A and 4B, each strap 51, 61 is in the form of a projection, or a lug, which has an opening in which is accommodated a shaft capable of relative rotation about its central axis.

The first strap 51 has a circular opening 53 which houses a cylindrical journal 54, while the second strap 61 has an elongate hole 63 which houses a cylindrical journal 64 capable of translation and rotation.

Each of the journals 54 and 64 is fixed in the common support 3, along a respective groove 52 or 62.

In other words, the support 3 is connected to the first actuator 5 via a pivot-type joint, the axis of which is parallel to the large faces and to the side faces of the common support 3, and to the second actuator 6 by means of a joint of a type combining a rotation, the axis of which is parallel to the large faces and to the side faces, and a slide, the axis of which is perpendicular to the axis of rotation of one journal and to the axis of rotation of the other journal.

Each of the straps 51 and 61 is moved in a movement of translation relative to the plate 7. In the case of the welding of tubular pipes, the support 3 is arranged such that the first and second straps 51, 61 are displaceable over a substantially circumferential surface about the pipes that are to be welded.

These pad eyes make it possible to induce a specific, controlled movement of the support 3, relative to the carriage 2. The pad eyes have, relative to the parts with which they cooperate, the mechanical play necessary for the satisfactory operation of the device, i.e. sufficient to allow their rotation/translation in one and other of the first groove 52 and second groove 62.

Depending on the movements of the straps 51, 61 and their combination, the common support 3 may be moved in a specific manner relative to the carriage 2.

When the first strap 51 and the second strap 61 are moved simultaneously relative to the carriage 2, in the same direction and with the same amplitude, the support 3 is translated, or slides, in a reciprocating movement in a plane parallel to the plane of the plate 7. This results in a movement known as "lateral oscillation" in the art, relative to the parts that are to be welded. The amplitude of this movement can be adjusted, for example by means of travel limiters, or automatically by adjusting the amplitude of the actuators 5.

FIG. 4A shows a momentary position of the support 3 when it is subject to a movement of lateral oscillation. The two actuators, in fact their respective journals, are located on the same side relative to the joint plane P and aligned along a line parallel thereto. Thus two annular weld beads superimposed along the thickness of the weld may be formed. The innermost bead is formed by the welding torch 41 or 42 placed at the front in relation to the direction of travel of the carriage 2, while the outermost bead of the pass is formed by the welding torch 41 or 42 placed behind.

When the two straps 51, 61 are moved simultaneously in the same direction and with an identical amplitude in relation to the carriage 2, but with a different centring, i.e. starting from a different alignment of these pad eyes (not parallel to the joint plane P), the support 3 and the welding torches 41, 42 will oscillate together in a movement referred to as lateral and two parallel weld beads will be formed. This is particularly useful for covering/finishing passes known as "capping", as a substantial bead width is obtained in one pass.

In other words, the support 3 is mounted on the carriage 2 with the capability of relative pivoting about an axis substantially perpendicular to the direction of sliding of the first strap 51 and to the direction of sliding of the second strap 61 under the effect of relative sliding of these straps 51, 61 relative to one another. In particular, this relative sliding may produce an offset, or movement off centre, to use the terminology mentioned above.

When the two straps 51, 61 are moved simultaneously in the same direction and with different amplitudes, the support 3 and the two welding means 4 oscillate together in a movement referred to as lateral, and two weld beads will be formed, as described hereinbefore. Here, one is therefore wider than the other.

When the two straps 51, 61 are moved simultaneously in two opposite directions and with the same amplitude relative to the carriage 2, the support 3 is subjected to a movement of rotation about its axis of symmetry XX. Weld beads are obtained which are laterally offset, i.e. in the direction of the length of the pipes that are to be welded. FIG. 4B shows a momentary position of the support 3 subject to such a movement.

When the two straps 51, 61 are moved simultaneously in two opposite directions relative to the carriage 2 and with a different amplitude from one another, the support 3 is subject to a movement of rotation about an axis that is offset relative to the axis XX. Weld beads are obtained which are produced respectively by the first torch 41 and the second torch 42, laterally offset from one another, one being wider than the other. The centre of rotation of the part 3 may be moved along an axis of symmetry YY as a function of the difference in relative amplitudes. FIG. 4B shows a momentary position of the support 3 when subjected to such a movement.

In relation to the parts that are to be welded, this movement of the pad eyes in opposite directions may be termed pseudo-pendular: a guide means successively meets the side walls of the space separating the parts that are to be welded, each time maintaining its distance from this wall but without maintaining the centre of rotation, in contrast to a pure pendular movement.

Without departing from the scope of the invention, more than two welding means may be provided on the common support 3, i.e. on the same welding head, depending on the particular case in question.

A command and control means is provided which is intended to produce one set of kinematics or another, as described above for illustrative purposes. Such a command and control means may comprise a programmable microcomputer or any equivalent means. Remote and wireless controls may be provided for controlling the progress of the welding operations.

When a single welding means is positioned in the centre of the support 3, this welding means may be subjected to a purely rotary oscillating movement. One or more welding means having an inclination angle that is not perpendicular to the trajectory parallel to the joint plane will have a movement comparable to a pendular oscillation. When the welding means are oriented towards the walls of the joint to be welded, they have an angle of attack similar to that provided by pendular oscillation.

It is also possible to provide individual motorisation for each welding torch 4. This allows a differentiated movement of each of the heads along its own longitudinal axis.

Interestingly, notably in MIG or MAG type welding, it is important to provide a specific atmosphere between the electrode wire and the surface to be welded. To this end, the welding device may comprise confinement means for delimiting and closing such a space.

According to one embodiment, these confinement means comprise cheeks or flanges 10, 10' which are fixed to the ends and on an extension of the outer walls of the support 3. These cheeks define, with the joints placed close to them, a substantially parallelepiped confined volume. The molten metal is thus insulated from the ambient air in a simple and effective manner.

An additional feature of the invention comprises providing the welding device with at least one sensor intended to evaluate the position of the support relative to the joint. A sensor of this kind is preferably located close to the joint. This makes it possible in particular to centre the axis XX of the block 3. The use of two sensors of this type, at each end of the block 3, allows good centring to be achieved and enables the axis XX of the support 3 to be positioned relative to the joint plane.

Without departing from the scope of the invention, TIG type welding may also be carried out, or laser welding, using the device described hereinbefore.

The support 3 is block-like in appearance. The rail-mounted carriage is a specific carrier, the carrier may have a different shape, particularly when attached to a robot.

In one way, the device described above can be seen as a welding device suitable for the assembly, by welding, of a first and second part at a weld joint, said parts defining between them a joint plane, the device comprising: carrier means enabling the device to be moved along the welding joint; at least one welding means cooperating with the said carrier means in order to be held at a spacing from said weld joint; automatic common and control means particularly for the carrier means. The at least one welding means is mounted on a single support oriented substantially parallel to said joint plane. The device further comprises a first motorised actuator fixed to said movable carrier means and provided with a first projection cooperating with a housing that is open on a first end face of said single support; a second motorised actuator fixed to said carrier means and provided with a second projection cooperating with a housing that is open on a second end face of said single support, so that the said first and second projections are movable in a plane substantially perpendicular to said joint plane and cause controlled movement of the support for the welding means.

Optionally, the device thus has the following complementary and/or supplementary features:
- The said command and control means allow simultaneous movement of the said first and second projections in the same direction.
- The said command and control means allow simultaneous movement of the said first and second projections in two opposite directions, so as to create rotation of said single support for the welding means about an axis substantially perpendicular to the weld joint.
- The command means enable the amplitude of the movement of the first and/or second projection to be varied independently.
- The device further comprises means for varying the spacing between said welding means and the weld joint.
- The device further comprises means for individually varying the distance between at least a first and/or at least a second welding means and said weld joint.
- The device further comprises confinement means located between the single support and the weld joint.
- The said confinement means comprise at least one flange cooperating with the single support and together defining a confinement space.
- The device further comprises at least one sensor fixed to at least one of the means of the device, intended to measure the position of said sensor relative to the weld joint.
- The parts to be joined by welding have at least one annular cross-section.

The invention claimed is:

1. A welding device comprising:
a carriage supporting at least one welding head configured to form a weld joint along a weld joint direction;
a first actuator comprising a part attached to the carriage and a moving part capable of sliding in a first direction; and
a second actuator located on an opposite side of the carriage from said first actuator comprising a part attached to the carriage and a moving part capable of sliding in a second direction, substantially parallel to the first direction; and
wherein the welding head is mounted on the carriage so as to be configured to pivot relative thereto about an axis substantially perpendicular to the first direction and to the second direction under effect of relative sliding of the moving part of one of the first and second actuators relative to that of the other of the first and second actuators; and
the welding head is configured to be controlled to move in rotation about a direction perpendicular to said weld joint direction.

2. A device according to claim 1, further comprising a command device capable of controlling a simultaneous movement of the moving parts of the first and second actuators in a same direction.

3. A device according to claim 1, wherein the command device is capable of controlling a simultaneous movement of the moving parts of the first and second actuators in opposite directions.

4. A device according to claim 3, wherein the simultaneous movement of the moving parts of the first and second actuators in opposite directions is such to cause the welding head to rotate about an axis substantially perpendicular to the first and second directions.

5. A device according to claim 1, wherein the command device is configured to vary an amplitude of sliding of the first and second moving parts, independently of one another.

6. A device according to claim 1, wherein the welding head is mounted on the carriage and is configured to slide relative thereto, perpendicular to the first direction and to the second direction.

7. A device according to claim 1, further comprising means for individually varying a spacing between a first welding means and the weld joint, between a second welding means and the weld joint, or varying a spacing of both the first and second weld means relative to the weld joint.

8. A device according to claim 1, further comprising a confinement part mounted on the welding head to define a confinement space.

9. A device according to claim 8, wherein the confinement part comprises at least one flange cooperating with the welding head and together defining a confinement space.

10. A device according to claim 1, further comprising at least one position sensor attached to the welding head.

11. A device according to claim 1, wherein the moving part of the first actuator is connected to the welding head by a pivot joint, the axis of which is perpendicular to the first direction of sliding, wherein the moving part of the second actuator is connected to the welding head by a connection that allows at least rotation about an axis perpendicular to the second direction of sliding and a sliding perpendicular to the axis of this rotation and to the second direction of sliding.

12. A device according to claim 1, wherein the moving part of the first actuator comprises a first projection cooperating with a housing that is open on a first end face of the welding head, and the moving part of the second actuator comprises a second projection cooperating with a housing that is open on a second end face of the welding head.

13. A device according to claim 1, wherein the welding head comprises an intermediate support mounted on the carriage by the first and second actuators and on which are mounted one or more welding torches.

* * * * *